July 8, 1924.

H. H. WHITE

POWER DELIVERING ATTACHMENT FOR MOTOR VEHICLES

Filed Nov. 9, 1922

INVENTOR.
Henry H. White
BY Vernon E. Hodges
his ATTORNEY

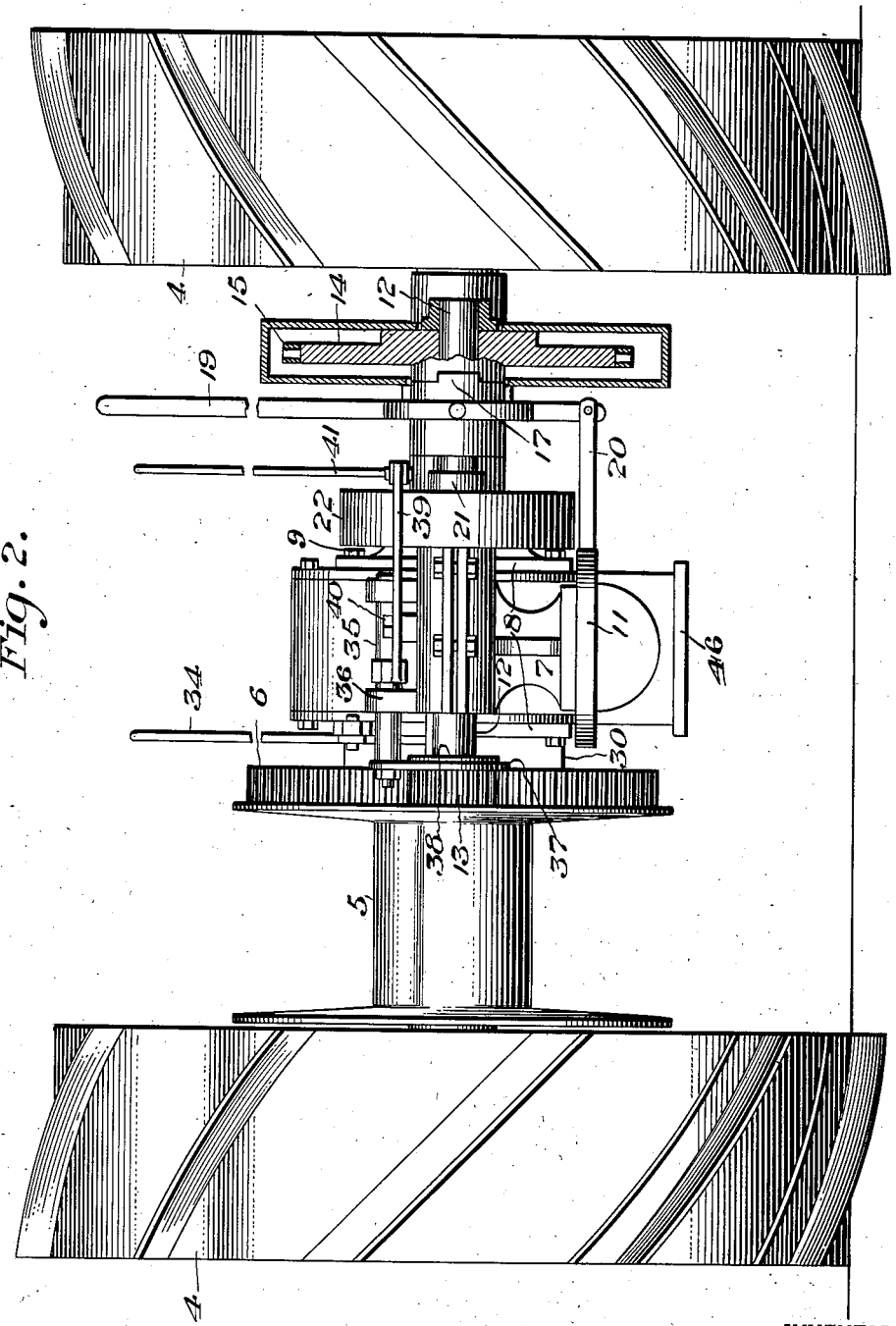

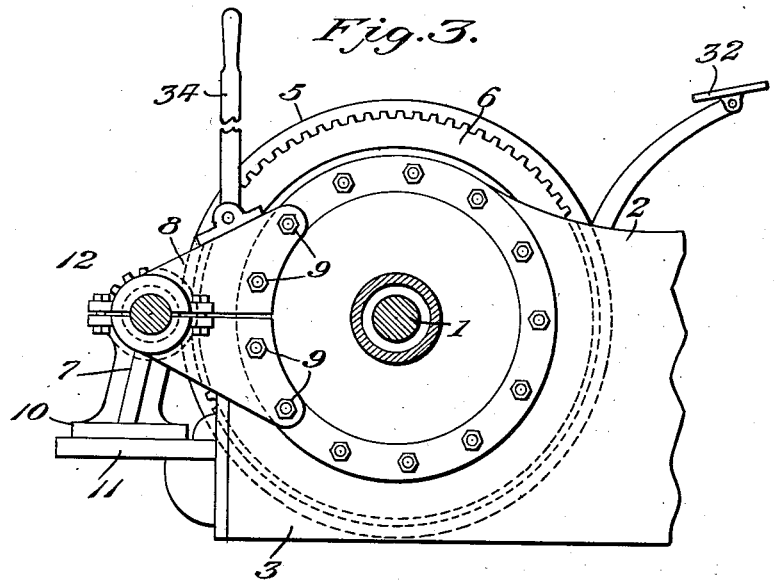
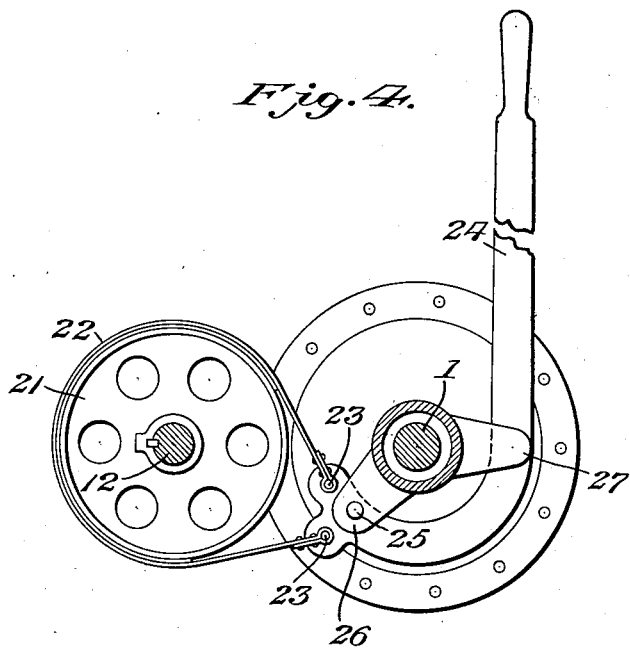

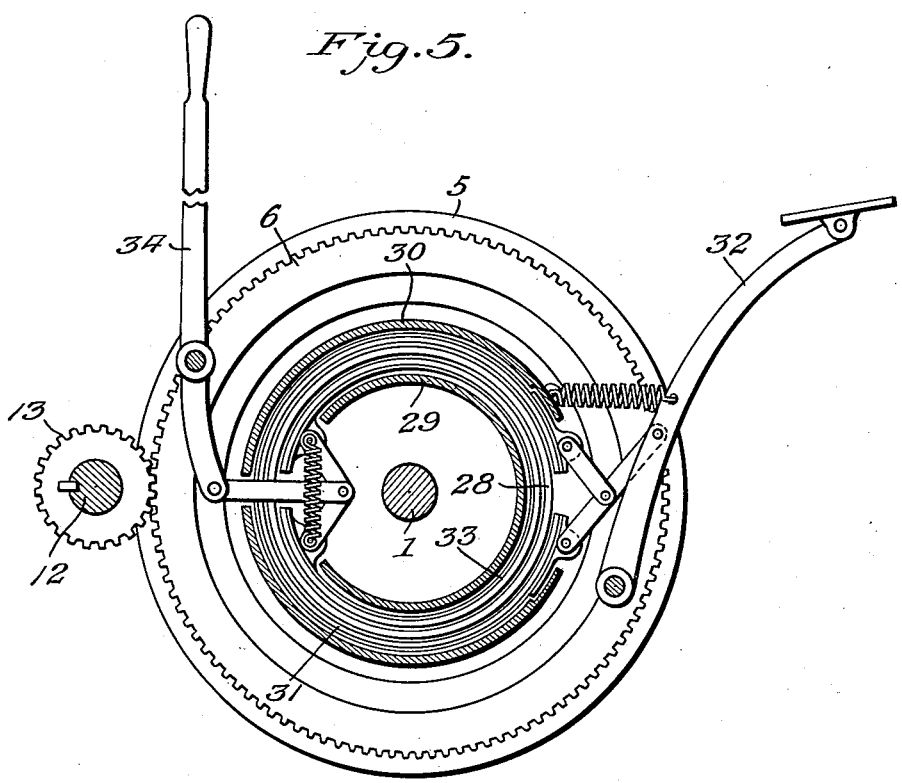

Patented July 8, 1924.

1,500,172

UNITED STATES PATENT OFFICE.

HENRY H. WHITE, OF MUSKOGEE, OKLAHOMA.

POWER-DELIVERING ATTACHMENT FOR MOTOR VEHICLES.

Application filed November 9, 1922. Serial No. 599,835.

*To all whom it may concern:*

Be it known that I, HENRY H. WHITE, a citizen of the United States, residing at Muskogee, in the county of Muskogee and State of Oklahoma, have invented certain new and useful Improvements in Power-Delivering Attachments for Motor Vehicles, of which the following is a specification.

This invention relates to a power delivering or portable hoisting winch, completely assembled as a unit, and installed on a well-known tractor, after removing the tractor axle housings and substituting housings designed by the inventor for the purpose of carrying the hoisting unit on the tractor. An object of my invention is to provide a complete unit to be installed on a tractor to be used as a portable contractor's or oil field hoist.

The object of my invention is to provide a rear housing to be substituted for the ordinary housing, the object being to provide means for carrying a cable drum on one side of the housing with brake attachments and drum driving mechanism on the opposite side.

A further object is to so arrange the drum driving controlling mechanism so that it may be operated from the seat of the tractor, the whole being so arranged that the braking of the load is on the jackshaft and on the cable drum.

A further object of my invention is to provide a free release drum adapted to spin on the housing, which is made possible by holding the load by means of brakes either on the jack-shaft or drum and by disengaging the clutch from the sprocket or by sliding the pinion out of gear or both.

The invention further provides and relates to the manner in which the winch is built into the tractor and not attached, so that the power-delivering assembly may function at all times without interfering with the usefulness for which the tractor was designed, and without the necessity of the substitution and equipment of specially designed wheels.

In the accompanying drawings:

Fig. 2 is a rear elevation;

Fig. 3 is a side elevation showing the manner in which the drive mechanism is arranged;

Fig. 4 is a detail view of the braking mechanism.

Fig. 5 is a side elevation of the auxiliary brake mechanism on the cable drum.

Figure 1:
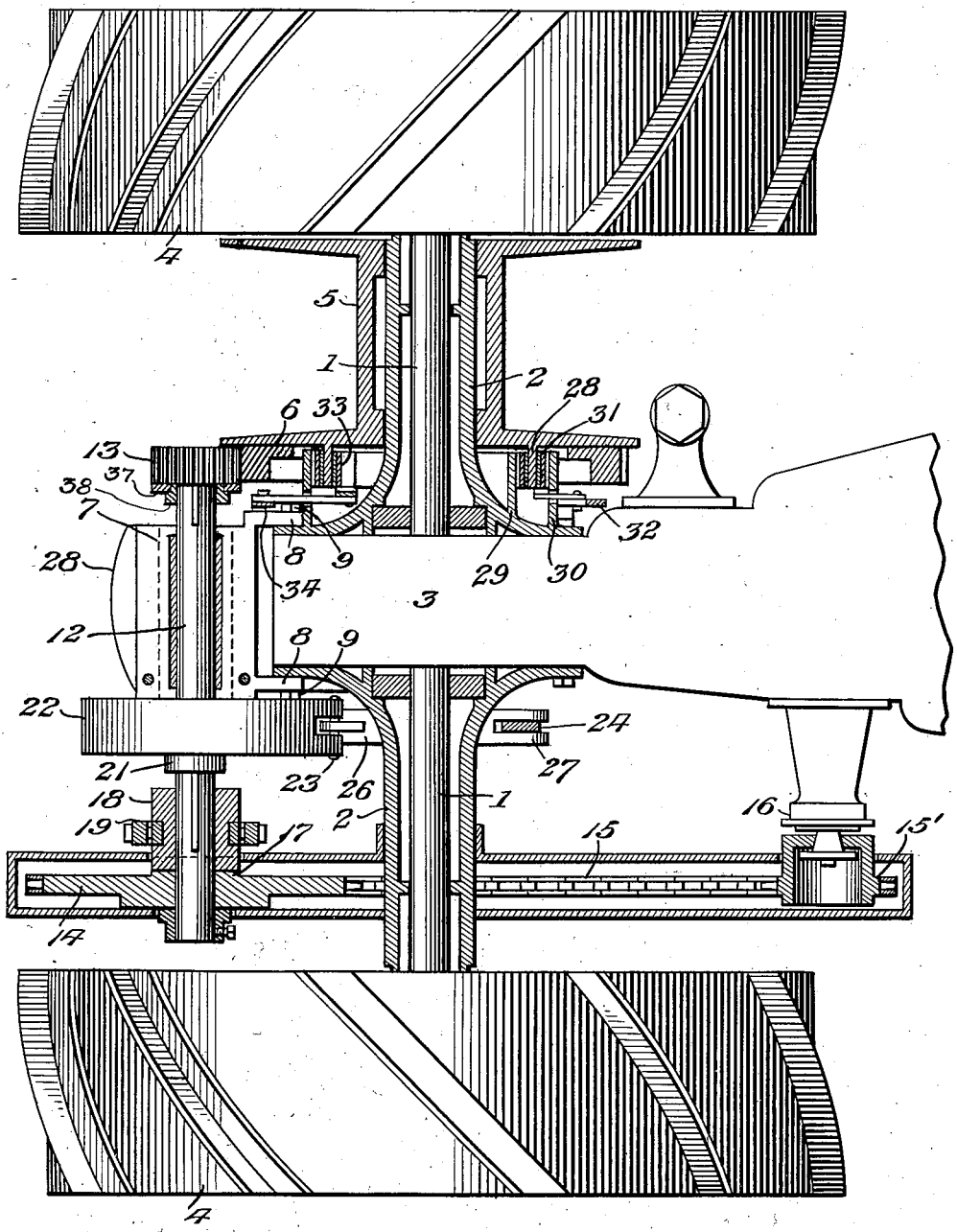
Fig. 1 is a top plan view of the rear portion of the tractor.

The numeral 1—1 indicates a rear axle surrounded by a rear axle housing 2 of a motor vehicle, having a central portion 3 to enclose the differential gearing (not shown). Tractor wheels 4—4 are provided for each end of the power axle 1—1.

Rotatably journaled on one side of the housing is a flanged cable drum 5 having secured thereto a gear 6. Secured to the differential housing is a bearing pedestal 7 having suitable flanges 8—8 adapted to be bolted to the differential housing by suitable bolts 9. The base 10 of the bearing is supported upon a bracket 11 extending rearwardly from the differential housing 3.

Supported in the bearing pedestal 7 is a jack-shaft 12 one end of which is provided with a pinion 13 slidably keyed to the jackshaft 12 adapted to mesh with the gear 6 carried by the cable drum 5. The other end of the shaft 12 has keyed thereto a sprocket-wheel 14 connected by means of a sprocket-chain 15 to the sprocket wheel 15' keyed to the auxiliary drive-shaft 16 of the tractor. The numeral 17 indicates a clutch member to which is secured the sprocket wheel 14. Slidably mounted upon the jack-shaft 12 is a clutch engaging member 18, adapted to be actuated by a clutch lever 19, the lower end of which is pivotally connected to a suitable support 20 extending laterally from the differential housing.

Keyed to the jack-shaft 12 is a brake-drum 21, and surrounding said drum is a brake band 22, the outer free ends of which are secured to pins 23—23 carried by a brake lever 24 pivoted as at 25 to a lug 26 supported upon the axle housing. A lug 27 extending forwardly from the housing acts as a guide for the brake lever 24.

The cable drum is preferably provided with an annular flange 28 extending outwardly therefrom and received within the annular flanges 29 and 30 extending outwardly from the axle housing 2. Surrounding the cable drum flange 28 is an external brake band 31 adapted to be operated by the foot pedal 32 arranged at the left of the machine. A second internal brake-band 33 is arranged to engage the inner face of the cable drum flange 28, the said band being expanded and contracted by means of an actuating lever 34 arranged at the right of the machine.

As a means for shifting the pinion 13 into and out of engagement with the gear 6, I preferably provide a shift-rod 35 arranged horizontally above the jack-shaft 12 being slidably supported in suitable lugs 36 extending upwardly from the bearing pedestal 7. One end of the shift-rod is provided with a forked yoke 37 adapted to engage a collar 38 of the pinion 13. The shift rod 35 is actuated by a bell crank 39 pivoted at 40 and attached to a lever 41.

From this construction it is obvious that the pinion 13 may be disengaged from the drum gear 6 thus permitting the drum 5 to rotate freely upon its bearings facilitating the use of the drum in handling light loads, and adding to the construction additional braking means whereby the mechanism may be under absolute control when handling heavy work. The foregoing disengaging mechanism is clearly described and claimed in a co-pending application Ser. No. 668,675, filed October 15, 1923, and no claim is made for the same in this application.

The draw-bar of the tractor is indicated by the numeral 46.

It is obvious that this arrangement permits of many uses of a tractor, where, for instance, the tractor with its load may become mired or stuck in the mud, the steel cable, spooled on the cable drum, is carried out and anchored ahead to some convenient point, the tractor is started up, and by operating the winch, is pulled out upon solid ground, the operation being repeated as often as required. It will be readily seen that this provision greatly increases the range of utility and efficiency of the tractor and is a great saving in wear and tear upon the tractor.

Many other uses of my improvement could be enumerated; by way of illustration, however, the device may be used for the purpose of pulling oil-wells. When this work is to be done, the tractor is located in proximity to the well; the cable is then run through a sheave or pulley at the bottom of the derrick, then over a pulley in the top of the derrick, then down to the well, and, by a suitable hitch or connection into the rack or tubing, said tubing and rack may be readily pulled from the well. It will be noted that the operator at all times has complete control of the tractor and equipment from the seat of the tractor.

It is obvious that this equipment may be designed for different forms of tractors without departing from the general scope of the invention.

I claim:

1. A power delivering attachment for a motor vehicle having a motor, propelling wheels, transmission-gearing including differential gearing and axle housings, a winding drum rotatably journaled on one of said axle-housings, an auxiliary drive-shaft carried by said housings and geared to said winding drum, means for driving said auxiliary shaft independently of the motor vehicle driving mechanism, and means for connecting and disconnecting the auxiliary shaft from the independent driving means.

2. A power delivering attachment for a motor vehicle having a motor, propelling wheels, transmission-gearing including differential gearing and axle housings, a belt-pulley shaft driven by the motor, a winding drum rotatably journaled on one of said housings, an auxiliary drive-shaft carried by said housings and geared to said winding drum, driving means connecting said belt pulley and said auxiliary drive-shaft, and a clutch mechanism arranged between said driving means and said auxiliary shaft.

3. A power delivering attachment for a motor vehicle having a motor, propelling wheels, transmission gearing including differential gearing and an axle housing, a winding drum rotatably journaled on the axle housing, an auxiliary drive-shaft arranged parallel with the axis of said winding drum and geared thereto, a belt pulley shaft driven by the motor and connected to said auxiliary drive-shaft, a clutch mechanism carried by said auxiliary drive-shaft and interposed between said belt pulley shaft and said auxiliary drive-shaft, a brake-drum carried by said auxiliary shaft, and a brake band surrounding said drum and actuated by a brake-lever pivotally mounted upon said axle housing.

4. A power delivering attachment for a motor vehicle having a motor, propelling wheels, transmission-gearing including differential gearing and an axle housing, a belt-pulley shaft driven by the motor, a winding drum rotatably mounted on said housing, an auxiliary drive-shaft carried by said housing and detachably geared to said winding drum, driving means connecting said belt-pulley shaft and said auxiliary drive-shaft including a clutch mechanism arranged between said driving means and said auxiliary shaft, a braking mechanism connected to said auxiliary drive-shaft, and a braking mechanism associated with said winding drum.

5. A power delivering attachment for a motor vehicle having a motor, propelling wheels, transmission-gearing including differential gearing and axle housings, a winding drum rotatably journaled on one of said axle housings, an auxiliary drive-shaft carried by said housings and detachably geared to said winding drum, means for driving said auxiliary shaft independently of the motor vehicle driving mechanism, means for connecting and disconnecting the auxiliary shaft from the independent driving means, and braking means associated with said winding drum.

6. A power delivering attachment for a motor vehicle having a motor, propelling wheels, transmission-gearing including differential gearing and an axle housing, a winding drum rotatably journaled on the axle housing, an auxiliary drive-shaft arranged parallel with the axis of said winding drum and detachably geared thereto, a belt pulley shaft driven by the motor and connected to said auxiliary drive-shaft, a clutch mechanism carried by said auxiliary drive-shaft and interposed between said belt pulley shaft and said auxiliary drive-shaft, a brake-drum carried by said auxiliary shaft, a brake band surrounding said drum and actuated by a brake-lever pivotally mounted upon said axle housing, and braking means associated with said winding drum.

7. A power delivering attachment for a motor vehicle having a motor, propelling wheels, transmission gearing and an axle housing, a winding drum rotatably mounted on said housing, an auxiliary drive-shaft arranged parallel with the axis of the winding drum and detachably geared thereto, means for driving the auxiliary shaft, a clutch mechanism carried by the auxiliary drive-shaft and interposed between said means and said auxiliary shaft, brake levers, a brake drum carried by said auxiliary shaft, a brake band surrounding said drum and connected with one of said brake levers, a brake band on said winding drum and connected with another of said brake levers.

8. A power delivering attachment for a motor vehicle having a motor, propelling wheels, transmission gearing including differential gearing and axle housings, a winding drum rotatably journaled on one of said axle housings, an auxiliary drive shaft carried by said housings and geared to said winding drum, and means for driving said auxiliary shaft.

9. A power delivering attachment for a motor vehicle having a motor, propelling wheels, transmission gearing including differential gearing and an axle housing, a winding drum rotatably journaled on said housing, an auxiliary drive shaft for driving said drum, means for driving said auxiliary drive shaft, a brake drum carried by said auxiliary shaft, and a brake band surrounding said drum and actuated by a brake lever pivotally mounted upon said axle housing.

10. A power delivering attachment for a motor vehicle including an axle housing, a winding drum, an auxiliary drive shaft for driving said drum, means for driving said auxiliary drive shaft, a brake drum carried by said auxiliary shaft, and a brake band surrounding said drum and actuated by a brake lever pivotally mounted upon said axle housing.

11. A power delivering attachment for a motor vehicle having a motor, propelling wheels, transmission gearing and an axle housing, a winding drum rotatably mounted upon said housing, an auxiliary drive shaft for driving said drum, means for driving the auxiliary shaft, brake levers, a brake band surrounding said drum and connected with one of said brake levers, and a second brake band on said winding drum and connected with another of said brake levers.

In testimony whereof I affix my signature.

HENRY H. WHITE.